United States Patent [19]

Matsumura

[11] Patent Number: 5,187,024
[45] Date of Patent: Feb. 16, 1993

[54] FUEL CELL GENERATING SYSTEM

[75] Inventor: Mitsuie Matsumura, Amagasaki, Japan

[73] Assignee: Mitsubishi Denki Kabushiki Kaisha, Tokyo, Japan

[21] Appl. No.: 733,900

[22] Filed: Jul. 22, 1991

[30] Foreign Application Priority Data

Jul. 23, 1990 [JP] Japan ................... 2-192974

[51] Int. Cl.$^5$ ................................ H01M 8/04
[52] U.S. Cl. ........................... 429/24; 429/26
[58] Field of Search ............... 429/20, 24, 26

[56] References Cited

U.S. PATENT DOCUMENTS

| 3,488,226 | 1/1970 | Baker et al. |
| 3,718,506 | 2/1973 | Fischer et al. ............. 429/26 X |
| 4,182,795 | 1/1980 | Baker et al. |
| 4,647,516 | 3/1987 | Matsumura et al. |
| 4,650,728 | 3/1987 | Matsumura et al. |
| 4,994,331 | 2/1991 | Cohen ........................ 429/26 X |
| 5,082,752 | 1/1992 | Koga et al. ................. 429/26 X |

FOREIGN PATENT DOCUMENTS 59-198669 11/1984 Japan ................... 429/26
224157 9/1988 Japan .

Primary Examiner—Stephen Kalafut
Attorney, Agent, or Firm—Sughrue, Mion, Zinn, Macpeak and Seas

[57] ABSTRACT

A fuel cell generating system allows temperature control so that the temperature of a fuel cell is kept constant. When the fuel cell is cooled, first and second reaction portions are controlled so that endothermic reaction of the circulating reaction gas proceeds in the first reaction portion, and exothermic reaction proceeds in the second reaction portion. When the fuel cell is heated, the reaction portions are controlled so that reverse reaction proceeds in each of the two reaction portions. It is therefore possible to control the temperature of a fuel cell stack with good efficiency by circulating a small amount of heat transfer medium, and to decrease the blower power loss.

7 Claims, 4 Drawing Sheets

FUEL CELL GENERATING SYSTEM

BACKGROUND OF THE INVENTION

1. Field of the Invention

The present invention relates to a generating system which employs a fuel cell apparatus.

2. Description of Related Art

FIG. 4 is a schematic drawing of the arrangement of a fuel cell apparatus and peripheral apparatuses for controlling the temperature thereof in a fused carbonate fuel cell generating system, as described in U.S. GRI Report No. FCR-3522-2. In the drawing, a fuel cell apparatus 1 comprises a fuel cell portion 1a having a fuel gas electrode and an oxidant gas electrode (not shown), a fuel gas passage 1b for supplying fuel gas A to the fuel gas electrode and an oxidant gas passage 1c for supplying oxidant gas B to the oxidant gas C electrode. An air supply apparatus 2 recovers power from the gas exhausted from the fuel cell generating system and supplies air D at a high pressure from the outside thereof. A circulating blower 3 for partially circulating the oxidant gas B is provided for controlling the temperature of the fuel cell apparatus 1. The temperature of the gas circulated by the circulating blower 3 on the oxidant gas side is controlled by a heat exchanger 4. Character E denotes a flow of fuel exhaust gas.

The operation is then described below. The fuel cell apparatus 1 has a single fuel cell or a fuel cell stack comprising a plurality of stacked fuel cells each of which produces an electrochemical reaction when the fuel gas A and oxidant gas B are supplied to the fuel gas passage 1b and the oxidant gas passage 1c, respectively. The fuel cell apparatus also serves as an energy transducer for extracting as electrical energy part of the chemical energy possessed by the fuel gas A and transforming the remainder to thermal energy as a by-product.

For example, a molten carbonate fuel cell apparatus is operated at about 650° C. and a phosphoric fuel cell apparatus is operated at about 200° C. The fuel cell apparatuses must be respectively kept at the above operating temperatures by appropriately controlling the temperatures. For example, during a steady-state operation conditions it is necessary to remove the thermal energy produced as a by-product in the fuel cell apparatus 1, i.e., it is necessary to cool the apparatus. On the other hand, during no-load conditions or operation with a small load, it is necessary to reversely heat the apparatus to prevent the fuel cell from getting colder due to heat-loss.

Examples of methods of controlling the temperature of the fuel cell apparatus for cooling or heating it include a method of circulating a liquid-phase heat transfer medium in the fuel cell apparatus 1 and a method of circulating a vapor-phase heat transfer medium. Particularly, the method of circulating the vapor-phase heat transfer medium has an advantage because of its ease of handing and high reliability. Since there is substantially no liquid-phase cooling medium which can be applied to a fuel cell apparatus operated at a high temperature, a vapor-phase heat transfer medium is frequently used in a fuel cell generating system with relatively small output, or a system which employs a fuel cell apparatus operated at a high temperature, e.g., a fused carbonate fuel cell apparatus. FIG. 4 shows an example of a generating system which uses such a vapor-phase heat transfer medium. The oxidant gas B discharged from the fuel cell apparatus 1 is partially recirculated to the inlet of the oxidant gas passage 1c of the fuel cell apparatus 1 by using the circulating blower 3 so that the oxidant gas which is also reaction gas is employed as a heat transfer medium for temperature control. During steady-state load operation conditions the temperature control of the fuel cell apparatus 1 is achieved by cooling the circulated oxidant gas at the heat exchanger 4.

During no-load or small-load operating conditions the temperature control of the fuel cell apparatus 1 is achieved by heating the circulated oxidant gas at the heat exchanger 4.

The conventional fuel cell apparatus configured as described above has the following problems:

(1) Since the vapor-phase heat transfer medium has a small heat capacity, the difference between the temperature of the heat transfer medium gas at the inlet and that at the outlet of the fuel cell apparatus is generally as large as about 100° C. A temperature distribution thus easily occurs in the direction of flow of the heat transfer medium gas. This accelerates the deterioration in characteristics of the fuel cell.

(2) Although the heat required for controlling the temperature of the fuel cell apparatus is received as sensible heat in the fuel cell apparatus or extracted therefrom, the sensible heat is easily lost, for example, as heat radiation from the exhaust pipe, during the temperature control process. This causes a decrease of the energy conversion efficiency in the generating system. Particularly, gaseous sensible heat has a low energy density, and thus the size of the heat exchanger for utilizing exhaust heat increases. It is therefore difficult to effectively utilize the exhaust heat.

(3) When the reaction gas is used as a heat transfer medium, it is necessary to supply the reaction gas in a large amount, for example, which is 3 times as much as the amount required only for electrochemical operation. In the case, the evaporation loss of electrolyte contained in the fuel cell apparatus is accelerated. Since the supply of the reaction gas thus interferes with the control of the temperature of the fuel cell apparatus, the control method is complicated, and the life of the fuel cell is decreased. There is also the problem that the generating efficiency is decreased by an increase in the blower power accompanying an increase in the circulating amount.

SUMMARY OF THE INVENTION

The present invention has been developed to solve the above problems, and it is an object of the invention to provide a fuel cell generating system which is capable of effectively heating and cooling by using only a small amount of heat transfer medium and which thus enables a decrease in the amount of the electrolyte evaporated by the heat transfer medium and a decrease in the loss of the blower power required for circulating the heat transfer medium necessary for heating and cooling.

To this end, the present invention provides a fuel cell generating system comprising: a single fuel cell or a fuel cell stack having a plurality of stacked fuel cells each of which has a fuel gas electrode and an oxidant gas electrode; and temperature control means for controlling the temperature of the stack, wherein the temperature control means includes a first reaction portion provided so as to be thermally combined with the stack, a second reaction portion provided at a position separated from the first reaction portion, a gas flow circuit provided so as to include the first and second reaction portions in a passage thereof, a reaction gas which can reversibly react by transfer of the heat supplied to the gas flow circuit, and a control portion for controlling the second reaction portion so that endothermic reaction is produced in the second reaction portion when exothermic reaction is produced in the first reaction portion, and exothermic reaction is produced in the second reaction portion when endothermic reaction is produced in the first reaction portion.

DESCRIPTION OF PREFERRED EMBODIMENTS

An embodiment of the present invention is described below with reference to the drawings.

Figure 1:
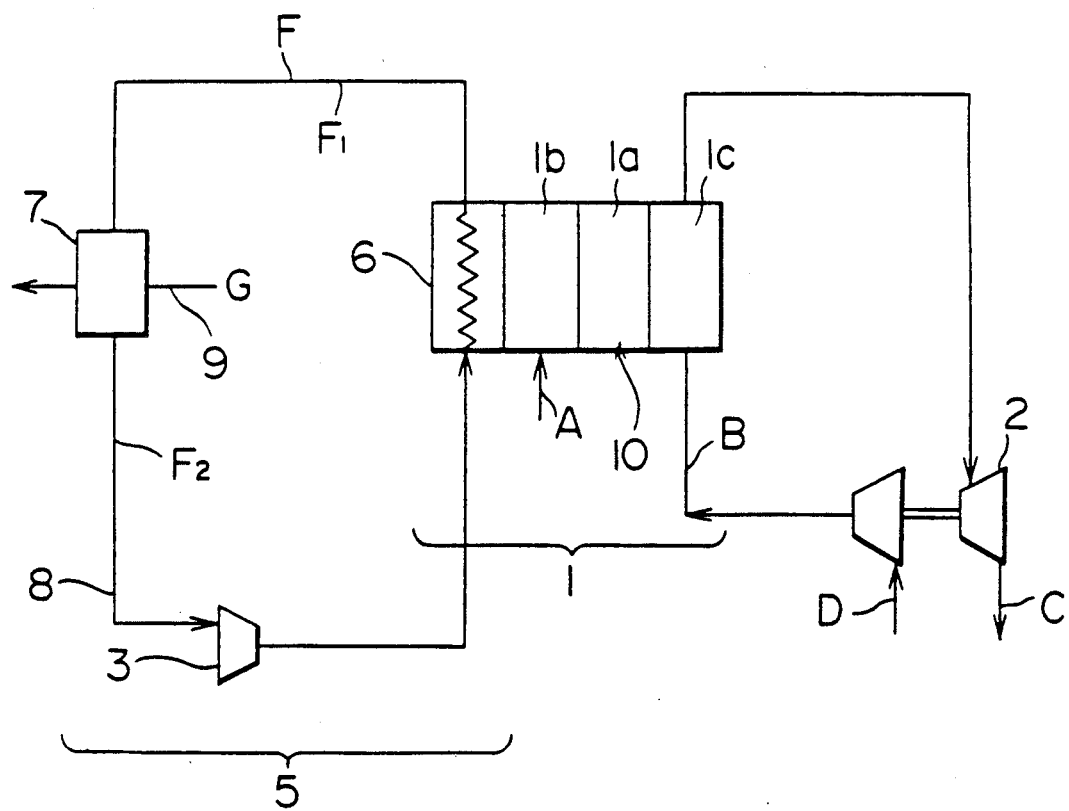
FIG. 1 is a drawing showing the arrangement of a fuel cell generating system in accordance with a first embodiment of the invention.

FIG. 1 is a drawing showing the arrangement of a fuel cell generating system according to an embodiment of the present invention. In the drawings, the members denoted by the same reference numerals are the same or equivalent portions.

A fuel cell stack 10 comprises a single fuel cell portion 1a or a plurality of stacked fuel cell portions 1a. A first reaction portion 6 is provided at a position adjacent to the fuel cell stack 10 so as to thermally combine therewith. The first reaction portion 6 also holds a reforming catalyst (not shown) therein. A fuel cell apparatus 1 comprises, as main components, the fuel cell stack 10, a fuel gas passage 1b, an oxidant gas passage 1c and the first reaction portion 6.

A second reaction portion 7 comprises a reforming reaction apparatus which holds a reforming catalyst (not shown) therein. A gas flow circuit 8 is provided so as to include the first reaction portion 6 and the second reaction portion 7 in the passage thereof. A circulating blower 3 circulates reaction gas F containing combustible gas serving as a heat transfer medium in direction of the arrows between the first and second reaction portions 6 and 7. A control portion 9 controls the temperature of the catalyst layer in the second reaction portion 7 by using a heat transfer medium G. A temperature control means 5 controls the temperature of the fuel cell stack 10 comprising the first and second reaction portions 6 and 7, the gas flow circuit 8, the control portion 9 and the blower 3. Since the other reference numerals denote the same members as those in the conventional apparatus, the members are not described below.

The operation is described below. The cooling operation is first described.

During the steady-state operating conditions of the fuel cell apparatus 1, since excess heat is generated, for example, in a quantity of about 30 to 70% of output power in the fuel cell stack 10, it is necessary to effectively remove the excess heat. In the embodiment shown in FIG. 1, the reaction gas F containing a hydrocarbon or alcohol and steam is introduced into the first reaction portion 6 so that a reforming reaction which is endothermic reaction proceeds in the first reaction portion 6 in order to cool the fuel cell stack 10. During this operation, for example, when the fuel cell used is a molten carbonate fuel cell, the reforming reaction expressed by the following equations (1) to (3) proceeds toward the right at the operating temperature of 600° C. to 700° C., which is a general operating temperature:

$$C_nH_m + nH_2O \rightarrow nCO + \frac{2n + m}{2} H_2 \quad (1)$$

$$\text{alcohol} + H_2O \rightarrow CO, CO_2, H_2 \quad (2)$$
$$CH_4 + H_2O \rightarrow CO + 3H_2 \quad (3)$$

The reaction gas $F_1$ containing as main components hydrogen, carbon monoxide and carbon dioxide, all of which are produced by the reforming reaction expressed by the equations (1) to (3), is supplied to the second reaction portion 7 by the operation of the circulating blower 3. Although the second reaction portion 7 is a reactor having a reforming catalyst therein like the first reaction portion 6, the operating temperature of the second reaction portion 7 is set at a value (for example, 450° to 550° C.) lower than the operating temperature (600° to 700° C.) of the first reaction portion 6 by the control portion 9 using the heat transfer medium G for temperature control.

The methane reforming reaction expressed by the equaltion (3) is reversible and has the tendency that the methane forming reaction (methanation reaction) proceeds towards the left in the equation (3) as the operating temperature is decreased. According to this tendency, the hydrogen and carbon monoxide contained in the reaction gas $F_1$ are converted to methane by the progress of the methanation reaction (the reaction toward the left in the equation (3)), while generating reaction heat (exothermic reaction). In order to keep the progress of the methanation reaction, it is necessary to keep the operating temperature of the second reaction portion 7 lower than that of the first reaction portion 6, It is thus necessary to remove the heat generated by the exothermic reaction from the second reaction portion 7. In the embodiment shown in FIG. 1, the second reaction portion 7 is cooled by the control portion 9 using the temperature control heat transfer medium G so that the operating temperature of the second reaction portion 7 is kept at a predetermined value. At this time, the exhaust heat (generated by the methanation reaction) released from the second reaction portion 7 is basically the exhaust heat of the fuel cell which is released from the stack 10 to the reaction gas F by the function of the first reaction portion 6. The reaction gas $F_2$ containing as main components the methane passed through the second reaction portion 7 is again supplied to the first reaction portion 6 with the aid of the circulating blower 3 so as to a gain function as a heat transfer medium for cooling the fuel cell stack 10 as the reforming reaction (3) proceeds.

In this way, the reaction gas F is circulated between the first and second reaction portions 6 and 7 so that the stack 10 is cooled by producing an endothermic reaction in the first reaction portion 6 and an exothermic reaction in the second reaction portion 7.

A description will now be given of the heating operation. When the fuel cell apparatus is kept at a no-load state or operated with a small load, heat loss and the heat removed by the reaction gas are greater than the heat generated by cell reaction. In order to keep the temperature of the fuel cell apparatus, therefore, the fuel cell stack 10 must be heated. In the embodiment shown in FIG. 1, for example, the second reaction 7 is kept at an operating temperature higher than that of the first reaction portion 6 by the control portion 9 using the temperature control heat transfer medium G so that the reforming reaction which is endothermic progresses in the second reaction portion 7, and the methanation reaction which is exothermic progresses in the first reaction portion 6, whereby the fuel cell stack 10 is heated.

Figure 3:
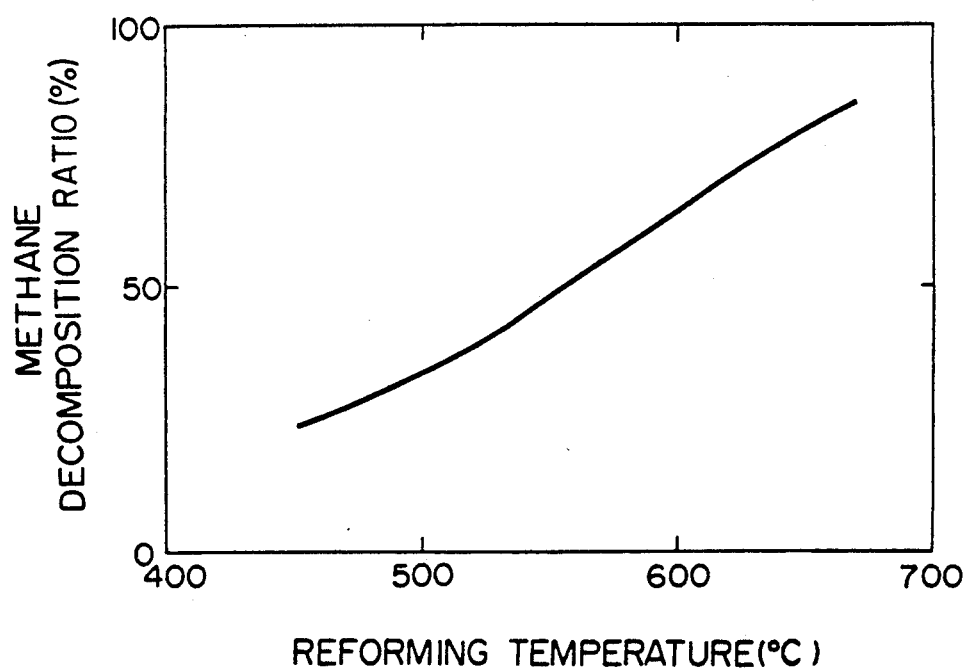
FIG. 3 is a characteristic drawing showing the dependency of the decomposition rate of methane on the reforming temperature.

In the above-described embodiment, it is important for efficiently controlling the temperature of the fuel cell stack 10 to appropriately set the operating temperature of the second reaction portion 7. FIG. 3 shows the dependency of the methane decomposition ratio on the reforming temperature. In the drawing, the ratio of steam to methane is 2.0 under atmospheric pressure.

Considering the cooling operation, for example, if the reforming temperatures of the first and second reaction portions 6 and 7 are 650° C. and 500° C., respectively, the difference in the ratio of methane decomposition under both conditions is 46%. In the above embodiment, the endothermic and exothermic heat generated by the reforming reaction and the methanation reaction are employed for transferring the heat by the heat transfer medium. Since the reaction heat is two orders in quantity per gas (heat transfer medium) volume greater than the sensible heat of the gas, only a small amount of gas can effectively transfer of heat. The above described temperature conditions enable a decrease in the necessary gas flow rate to as low as 1/150~1/50 of that of a heat transfer medium which simply employs sensible heat. It is thus possible to decrease the size of piping, heat radiation and the loss of blower power. The exhaust heat discharged from the fuel cell stack 10 is mostly transferred in the form of chemical energy possessed by the heat transfer medium to the second reaction portion 7. Since the exhaust heat stored in the form of chemical energy is not lost by heat transfer, the total heat loss caused by heat transfer can be decreased. In addition, since the presence of the reforming catalyst is indispensable to the progress of the reforming reaction in the first reaction portion 6, the temperature distribution on the surface of the first reaction portion 6 can be easily controlled by appropriately arranging the reforming catalyst. This is a significant advantage, as compared with a temperature controller which simply employs sensible heat.

As described above, in the above embodiment, either of the reforming reaction and the methanation reaction is progressed by the function of the reforming catalyst held by the first and second reaction portions 6 and 7 so that the temperature of the fuel cell apparatus can be controlled by utilizing the endothermic heat generated by the reforming reaction and exothermic heat generated by the methanation reaction. In the temperature control means 5 of this embodiment, since heat is transferred in the form of chemical energy of the combustible gas serving as the heat transfer medium, the temperature of the fuel cell apparatus can efficiently be controlled with a small amount of the heat transfer medium circulated and with low blower power, without any adverse effect of heat loss. Further, uniform cooling and heating of the fuel cell apparatus can be easily realized by appropriately arranging the reforming catalyst.

Although gas which produces the reforming reaction and methanation reaction is used as the reaction gas which can reversibly react in the above embodiment, the reaction gas is not always limited to this. Other reaction species may be used according to the temperature region of the temperature control concerned. It is a matter of course that the type and amount of the catalyst used can be appropriately changed.

Figure 2:
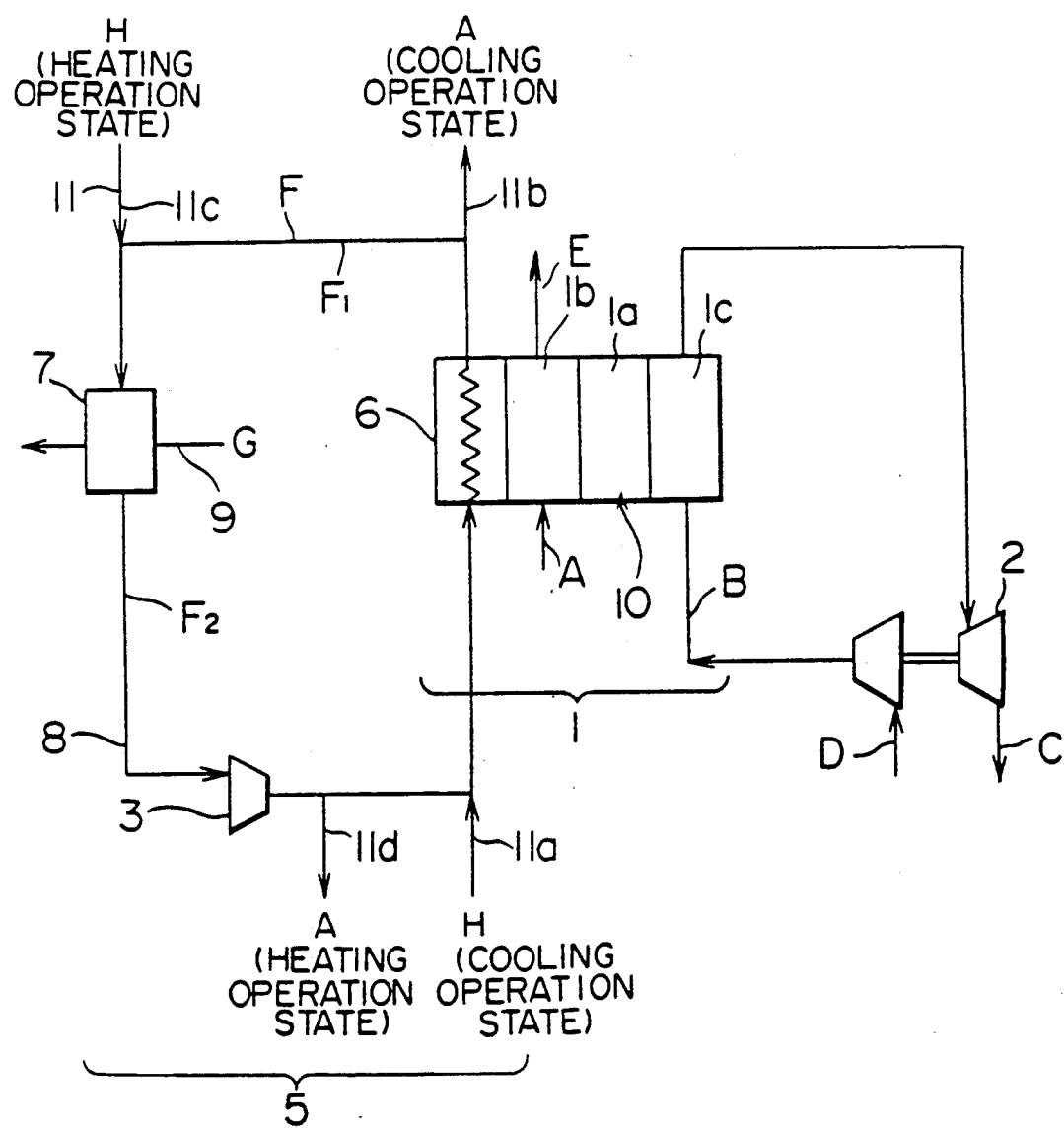
FIG. 2 is a drawing showing the arrangement of a fuel cell generating system in accordance with a second embodiment of the invention.
Figure 4:
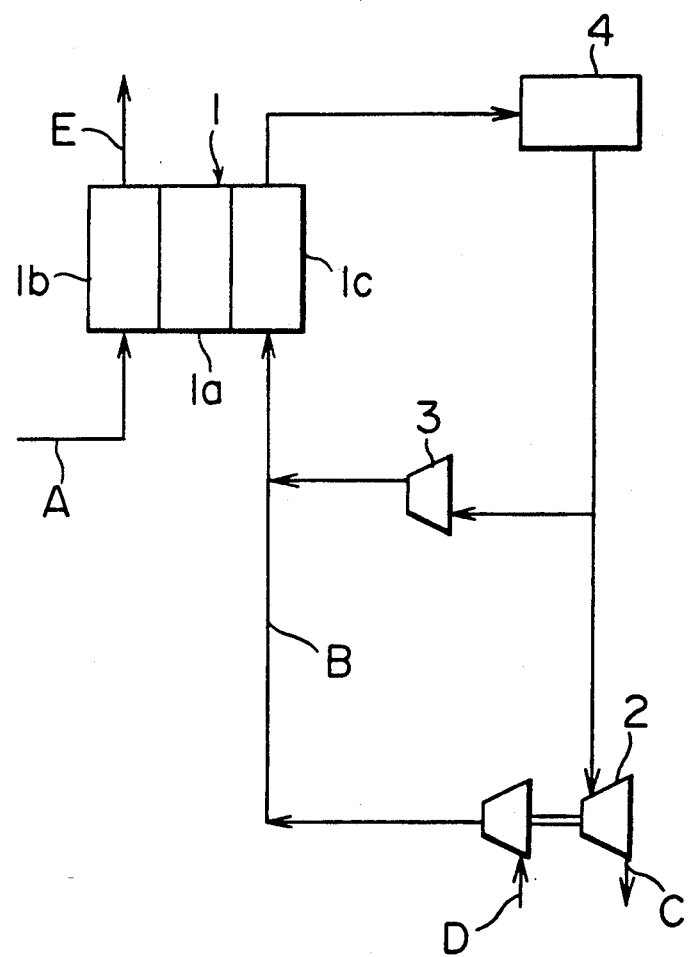
FIG. 4 is a drawing showing the arrangement of a conventional fuel cell generating system.

FIG. 2 is a drawing showing the arrangement of a fuel cell generating system in accordance with a second embodiment of the invention. In the drawing, H denotes fuel cell raw fuel gas containing as main components a hydrocarbon or alcohol and steam. In this embodiment, gas supply means 11 supplies fuel gas A containing hydrogen as a main component to the fuel gas passage 1b of a fuel cell stack 10 after the raw fuel gas H has been reformed in a circulation system 8. The other reference numerals denote the same as those in the embodiment shown in FIG. 1.

The operation is described below. The embodiment shown in FIG. 2 comprises as main components the first and second reaction portions 6 and 7 and the gas flow circuit 8. In this embodiment, the temperature control means 5 for controlling the temperature of the fuel cell stack 10 is used for controlling the temperature of the stack 10 and also used as a fuel treatment system for the raw fuel gas H of the fuel cell, which contains as a main component a hydrocarbon or alcohol.

The cooling operation state is first described below. The raw fuel gas H supplied from the outside and containing as a main component a hydrocarbon or alcohol is supplied to the gas flow circuit 8 for the combustible gas through the portion shown by 11a. In steady state operating conditions, the control portion 9 controls the fuel cell apparatus 1 so that the reforming reaction proceeds in the first reaction portion 6, and the methanation reaction proceeds in the second reaction portion 7 in order to cool the fuel cell stack 10. The raw fuel gas H is reformed in the first reaction portion 6 in accordance with the equations (1) to (3) to be converted to the fuel gas containing as a main component hydrogen. The fuel gas is partially discharged as the fuel gas A from the gas flow circuit 8 through the portion 11b and supplied to the fuel gas passage 1b of the fuel cell stack 10 and used for power generation as shown by A in the drawing.

The heating operation state is described below. In the heating operation state, the control portion 9 controls the fuel cell apparatus 1 so that the methanation reaction proceeds in the first reaction portion 6, and the reforming reaction proceeds in the second reaction portion 7. The raw fuel gas supplied to the gas flow circuit 8 for the combustible gas through the a portion 11c is thus reformed in the second reaction portion 7, then partially discharged as the fuel gas A from the gas flow circuit 8 through a portion 11d and supplied to the fuel gas passage 1b, as shown by A. The cooling and heating of the fuel cell stack 10 are controlled by the temperature control means 5 using the first and second reaction portions 6 and 7 in the same way as the embodiment shown in FIG. 1.

In this embodiment of the invention, since the temperature control system 5 for the fuel cell apparatus 1 also serves as the fuel treatment apparatus for the raw fuel gas, the simplification of the generating system and the effective utilization of the exhaust heat of the fuel cell can be achieved. In addition, when a fuel cell stack of an internal reforming type having a reforming catalyst in the fuel gas passage 1b is used as the fuel cell stack 10, a hydrocarbon which is not decomposed according to the chemical equilibrium in the first reaction portion 6 due to the restriction on the operating temperature of the fuel cell can be easily converted to hydrogen as the internal reforming reaction proceeds, thereby achieving the effective utilization of the raw fuel gas and a further improvement in the efficiency of power generation. Although the generating system of this embodiment also has the same function as that of an internal reforming-type fuel cell generating system having a reforming catalyst in a fuel gas passage from the viewpoint that the raw fuel is reformed by using excess exhaust heat generated from the fuel cell apparatus, the generating system of this embodiment further has the following advantages:

(1) Under steady state load operating conditions, it is necessary to cool by employing both an internal reforming reaction and reaction gas because of an excessive cooling load even in a conventional internal reforming-type generating system. The temperature control of the fuel cell apparatus becomes difficult and complicated, and a uniform temperature distribution cannot be easily obtained. On the other hand, in this embodiment, for example, the amount of the combustible gas circulated is controlled so that the fuel cell apparatus can be cooled by utilizing only the reforming reaction. It is thus possible to more easily control the temperature with good efficiency. In addition, since the electrode reaction is separated from the reforming reaction, unlike the internal reforming reaction, the degree of freedom for arranging of the reforming catalyst in the first reaction portion 6 is large, and the temperature can thus be easily controlled by appropriately arranging the catalyst.

(2) This embodiment permits the heating of the fuel cell stack 10.

Although each of the above embodiments concerns the case in which either of the reforming reaction or methanation reaction progresses in each of the first and second reaction portions 6 and 7 by utilizing the dependency of the methane decomposition ratio on the reforming temperature, the invention is not limited to this. For example, the dependency of the methane decomposition ratio on operating pressure can be utilized. For example, during the cooling operation, methanation can proceed in the second reaction portion 7 by increasing the pressure of the combustible gas F containing as main components hydrogen, carbon monoxide and carbon dioxide, all of which are produced by the reforming reaction in the first reaction portion 6. At this time, the operating temperature of the second reaction portion 7 can be set to a value higher than that in the embodiment shown in FIG. 1, and thus an attempt can be made to effectively utilize the exhaust heat. In addition, the power required for increasing pressure can be recovered during decreasing pressure at the time the combustible gas F is supplied to the first reaction portion 6 from the second reaction portion 7.

Although the embodiment shown in FIG. 2 concerns a case in which the position of gas supply means where the raw fuel gas F is supplied to or discharged from the combustible gas circuit 8 in the heating operating state is different from that in the cooling operation state, the positions in both states can be the same, and the supply and discharge positions are not limited to those shown in FIG. 2. For example, in the heating operation state, when the fuel cell apparatus is kept in a no-load state, or when the fuel cell stack is an internal reforming type, since there is no problem even if the decomposition ratio of methane fed as the fuel gas A is slightly low, the supply and discharge positions of the combustible gas in the heating operation state shown in FIG. 2 may be the same as those in the cooling operation state. As a result of the reforming reaction at a relatively low temperature, the hydrocarbon or alcohol, which is contained in the raw fuel gas and not decomposed in the combustible gas circuit, is internally reformed in the fuel cell stack, thereby obtaining the effect of improving the efficiency of power generation by effectively utilizing the raw fuel.

Further, in the second reaction portion 7, the reforming reaction layer which holds the catalyst must be cooled and heated in the cooling and heating operation states, respectively. Although the embodiments respectively shown in FIGS. 1 and 2 concern a case where cooling and heating are performed by the control portion 9 using the heat transfer medium G, the invention is not limited to this. For example, a combustor for heating may be provided in the second reaction portion 7. For example, in a fuel cell generating system, the fuel exhaust gas E which is not used in the fuel cell apparatus 1 can be utilized as fuel gas for the combustor. In addition, the exhaust heat generated in the second reaction portion 7 during the cooling operation can be effectively used for preheating the oxidant gas B and generating steam in the generating system.

The above embodiments are only examples provided for facilitating the understanding of the present invention, and it is to be understood that various changes may be made within the scope of the spirit of the present invention.

What is claimed is:

1. A fuel cell generating system, comprising: fuel cell means comprising one of a single fuel cell and a which has a fuel gas electrode and an oxidant gas electrode, fuel cell stack having a plurality of stacked fuel cells, each of temperature control means for controlling the temperature of said fuel cell means, said temperature control means including a first reaction portion provided so as to be thermally combined with said fuel cell means; a second reaction portion provided at a position different from said first reaction portion; a gas flow circuit provided so as to include said first and second reaction portions in a passage thereof; a reaction gas which can reversibly react when giving and receiving heat supplied to said gas flow circuit; and a control portion for controlling said second reaction portion so that endothermic reaction is produced in said second reaction portion when exothermic reaction is produced in said first reaction portion, and exothermic reaction is produced in said second reaction portion when endothermic reaction is produced in said first reaction portion.

2. A generating system according to claim 1 wherein said first reaction portion has a reforming catalyst.

3. A generating system according to claim 1 wherein said second reaction portion has a reforming catalyst.

4. A generating system according to claim 1 wherein said reaction gas is gas which undergoes a methanation reaction.

5. A generating system according to claim 1 wherein said reaction gas is gas which undergoes a reforming reaction.

6. A generating system according to claim 1 further comprising gas supply means for supplying raw fuel gas containing a hydrocarbon or alcohol to said gas flow circuit and gas supply means for partially supplying as fuel gas said reaction gas circulating in said gas flow circuit to said fuel cell means.

7. A generating system according to claim 6 wherein said stack has the ability to reform hydrocarbon or alcohol in fuel gas at a fuel gas passage of said stack.

* * * * *